US012704904B2

(12) United States Patent
Liu et al.

(10) Patent No.: US 12,704,904 B2
(45) Date of Patent: Aug. 11, 2026

(54) METHOD FOR INTERACTING WITH VIRTUAL KEYBOARD, ELECTRODE DEVICE, AND STORAGE MEDIUM

(71) Applicant: Beijing Zitiao Network Technology Co., Ltd., Beijing (CN)

(72) Inventors: Chin-Wei Liu, Beijing (CN); Shuo Liu, Beijing (CN); Jianhang Sun, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 30 days.

(21) Appl. No.: 18/466,305

(22) Filed: Sep. 13, 2023

(65) Prior Publication Data

US 2024/0103625 A1 Mar. 28, 2024

(30) Foreign Application Priority Data

Sep. 27, 2022 (CN) ......................... 202211195123.6

(51) Int. Cl.
*G06F 3/01* (2006.01)
*G06T 19/00* (2011.01)

(52) U.S. Cl.
CPC .............. *G06F 3/016* (2013.01); *G06F 3/012* (2013.01); *G06F 3/013* (2013.01); *G06T 19/006* (2013.01)

(58) Field of Classification Search
CPC ........ G06T 19/006; G06F 3/016; G06F 3/011; G06F 3/0236; G06F 3/013; G06F 3/04886; G06F 3/012; G06F 3/048
See application file for complete search history.

(56) References Cited

U.S. PATENT DOCUMENTS

2009/0201248 A1* 8/2009 Negulescu .............. G06F 3/016
345/157
2014/0002248 A1* 1/2014 Zawacki ................. G06F 3/016
340/407.1

(Continued)

FOREIGN PATENT DOCUMENTS

CN 101825944 A 9/2010
CN 105975053 A 9/2016

(Continued)

OTHER PUBLICATIONS

"How many motors are hidden in your phone?," Motor technology internal reference, Mar. 28, 2018, retrieved from https://baijiahao.baidu.com/s?id=1596098425503548512&wfr=spider&for=pc, 6 pages.

(Continued)

*Primary Examiner* — Yaron Cohen
(74) *Attorney, Agent, or Firm* — Astute IP Law Group

(57) ABSTRACT

The present disclosure relates to an interaction method and apparatus, an electronic device, a storage medium, and a computer program product, wherein the method includes: presenting a virtual keyboard in an extended reality space; detecting a position and an action of a user finger relative to the virtual keyboard; and outputting a vibration signal based on the position and the action of the user finger relative to the virtual keyboard, wherein the vibration signal is used for prompting a position of the user finger in the virtual keyboard and/or an operation action of the user finger on a virtual key in the virtual keyboard.

14 Claims, 3 Drawing Sheets

(56) References Cited

U.S. PATENT DOCUMENTS

| | | | | |
|---|---|---|---|---|
| 2017/0038830 | A1* | 2/2017 | Clement | ............. G06F 3/04847 |
| 2023/0359279 | A1 | 11/2023 | Liu et al. | |
| 2025/0110562 | A1 | 4/2025 | Xu et al. | |

FOREIGN PATENT DOCUMENTS

| | | | |
|---|---|---|---|
| CN | 107533373 | A | 1/2018 |
| CN | 110134230 | B | 3/2021 |
| CN | 113467617 | A | 10/2021 |
| CN | 114690887 | A | 7/2022 |
| CN | 115047966 | A | 9/2022 |
| CN | 115047972 | A | 9/2022 |
| EP | 4276591 | A1 | 11/2023 |
| JP | 2002-046265 | A | 2/2002 |

OTHER PUBLICATIONS

"Take stock of the black tech VR gear that simulates haptics," Oct. 10, 2016, Steam online, retrieved from https://www.jiemian.com/article/891411.html, 5 pages.

Robin Yuan, "Vibration feedback—LRA characteristics," Dec. 5, 2021, retrieved from https://zhuanlan.zhihu.com/p/441457690, 4 pages.

Dizzarz, "Why do we need "haptics" and "force feedback" in VR? How to create "haptics" and "force feedback" in VR?," Mar. 8, 2023, retrieved from https://www.zhihu.com/question/37552388, 65 pages.

Office Action received for Chinese Patent Application No. 202211195123.6, mailed on May 30, 2026, 22 pages (11 pages of English Translation and 11 pages of Original Document).

* cited by examiner

METHOD FOR INTERACTING WITH VIRTUAL KEYBOARD, ELECTRODE DEVICE, AND STORAGE MEDIUM

CROSS-REFERENCE TO RELATED APPLICATIONS

The present disclosure is based on and claims priority to China Patent Application No. 202211195123.6 filed on Sep. 27, 2022 and entitled as "Interaction Method and Apparatus, Electronic Device, Storage Medium, and Computer Program Product", the disclosure of which is incorporated by reference herein in its entirety.

TECHNICAL FIELD

The present disclosure relates to a technical field of Extended Reality, and in particular, to an interaction method and apparatus, an electronic device, a storage medium, and a computer program product.

BACKGROUND

Extended Reality (XR for short) refers to, by combining reality and virtuality by a computer, building a virtual environment capable of human-computer interacting, and is also a general term for various technologies such as AR, VR, and MR. Extended Reality brings an experiencer a "sense of immersion" of seamless conversion between a virtual world and a real world.

SUMMARY

The present disclosure provides an interaction method and apparatus, an electronic device, a storage medium, and a computer program product.

In a first aspect, the present disclosure provides an interaction method, the method comprising:

presenting a virtual keyboard in an extended reality space;

detecting a position and an action of a user finger relative to the virtual keyboard; and outputting a vibration signal based on the position and the action of the user finger relative to the virtual keyboard, wherein the vibration signal is used for prompting a position of the user finger in the virtual keyboard and/or an operation action of the user finger on a virtual key in the virtual keyboard.

In a second aspect, the present disclosure further provides an interaction apparatus, the apparatus comprising:

a presentation module configured to present a virtual keyboard in an extended reality space;

a detection module configured to detect a position and an action of a user finger relative to the virtual keyboard; and an output module configured to output a vibration signal based on the position and the action of the user finger relative to the virtual keyboard, wherein the vibration signal is used for prompting a position of the user finger in the virtual keyboard and/or an operation action of the user finger on a virtual key in the virtual keyboard.

In a third aspect, the present disclosure further provides an electronic device, the electronic device comprising:

one or more processors; and a storage device configured to store one or more programs, wherein the one or more programs, when executed by the one or more processors, causes the one or more processors to implement the interaction method as described above.

In a fourth aspect, the present disclosure further provides a non-transitory computer-readable storage medium having a computer program stored thereon, wherein the computer program, when executed by a processor, implements the interaction method as described above.

In a fifth aspect, the present disclosure further provides a computer program product, comprising a computer program or instructions which, when executed by a processor, implements the interaction method as described above.

BRIEF DESCRIPTION OF THE DRAWINGS

The accompanying drawings here, which are incorporated in and constitute a part of this description, illustrate embodiments consistent with the present disclosure and, together with the description, serve to explain the principles of the present disclosure.

In order to more clearly illustrate the embodiments of the present disclosure or technical solutions in the related art, the drawings that need to be used in the description of the embodiments or the related art will be briefly described below, and it is apparent that, for one of ordinary skill in the art, other drawings can also be obtained according to these drawings without paying out creative efforts.

DETAILED DESCRIPTION

Figure 1:
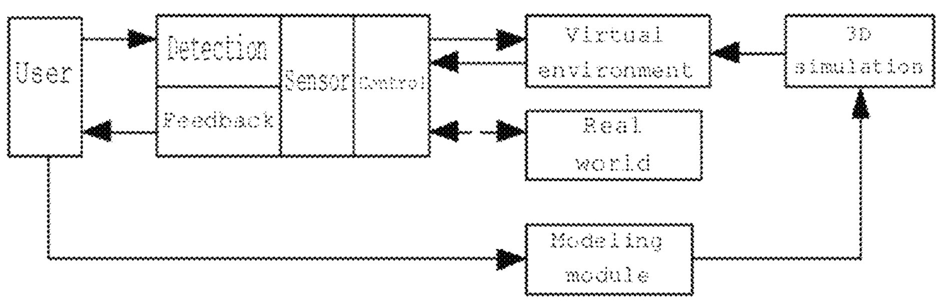
FIG. 1 is a structural block diagram of an extended reality device provided in an embodiment of the present disclosure.

In order that the above objectives, features and advantages of the present disclosure may be more clearly understood, the solutions of the present disclosure will be further described below. It should be noted that, in the case of no conflict, the embodiments and features in the embodiments of the present disclosure may be combined with each other.

In the following description, numerous specific details are set forth in order to facilitate a thorough understanding of the present disclosure, but the present disclosure may be implemented in other ways different from those described here; and it is apparent that the embodiments in the description are only a part of the embodiments of the present disclosure, and not all of them.

Extended Reality (XR for short) refers to, by combining reality and virtuality by a computer, building a virtual environment capable of human-computer interacting, and is also a general term for various technologies such as AR, VR, and MR. By fusing visual interaction technologies of the three, a "sense of immersion" of seamless conversion between a virtual world and a real world is brought to an experiencer.

Upon use of an extended reality device, a user often needs to perform information input, for example, input English words, Chinese characters, numbers, punctuations, etc. into the extended reality device. The information input problem in an extended reality space is a key problem affecting ecological development. With the maturity of technologies, bare-handed (i.e., without use of an additional controller) operation of a virtual keyboard to complete information input can be achieved currently. However, in the existing bare-handed input solution, since the user needs to keep eyes on the virtual keyboard in real time to select and trigger a virtual key, touch typing cannot be made, which causes inefficiency of information input of the user.

Compared with the related art, the technical solution provided in the embodiment of the present disclosure has the following advantages:

in the technical solution provided in the embodiment of the present disclosure, by detecting the position and the action of the user finger relative to the virtual keyboard; and outputting the vibration signal based on the position and the action of the user finger relative to the virtual keyboard, the vibration signal being used for prompting the position of the user finger in the virtual keyboard and/or the operation action of the user finger on the virtual key in the virtual keyboard, upon bare-handed operation of the virtual keyboard, in the case of not watching the virtual keyboard with eyes, the user can, through the vibration signal, discriminate the position of the virtual key and whether the virtual key is successfully triggered, which is beneficial to development of a touch typing habit, and improves the efficiency of information input of the user.

An extended reality device is a terminal capable of achieving an extended reality effect, and may be generally provided in a form of glasses, a head mounted display (HMD), or contact lenses, for achieving visual perception and another form of perception; of course, the extended reality device is not limited to such implementation forms, and can be further miniaturized or enlarged as needed.

The extended reality device can create a virtual scene. The virtual scene is a virtual scene displayed (or provided) when an application runs on an electronic device. The virtual scene can be a simulation environment for a real world, or a semi-simulation semi-fictional virtual scene, or a pure fictional virtual scene. The virtual scene may be any of a two-dimensional virtual scene, a 2.5-dimensional virtual scene, or a three-dimensional virtual scene, wherein the dimension of the virtual scene is not limited in the embodiments of the present application.

FIG. 1 is a structural block diagram of an extended reality device provided in an embodiment of the present disclosure. Referring to FIG. 1, exemplarily, main function modules of the extended reality device may include, but are not limited to, the following components: 1) detection (module): detecting an operation command of a user by using various sensors, and acting it on a virtual environment, such as continuously updating an image displayed on a display screen by following a line of sight of the user, to achieve interaction between the user and a virtual scene, for example, continuously updating display content based on a detected rotation direction of a user head; 2) feedback (module): receiving data from the sensor(s), and providing real-time feedback for the user; 3) sensors: on one hand, accepting the operation command from the user and acting it on the virtual scene; and on the other hand, providing a result generated after the operation to the user in various feedback forms; 4) control module: controlling the sensors and various input/output device, including obtaining user's data (e.g., actions, voice) and outputting perception data such as image, vibration, temperature, sound, or the like to have an effect on the user, the virtual environment, and the real world; and 5) modeling module: constructing a three-dimensional model of the virtual environment, wherein various feedback mechanisms such as sound, sense of touch, or the like in the three-dimensional model may also be included.

In an extended reality scene, selection of the user for an object (such as a virtual object and a virtual control) or area in a virtual scene may be implemented through a controller, which may be a handle, so that the user selects the object or area through operation on a key of the handle. Of course, in another embodiment, an object or area in an extended reality device may be selected using a gesture or voice instead of using the controller.

Figure 2:
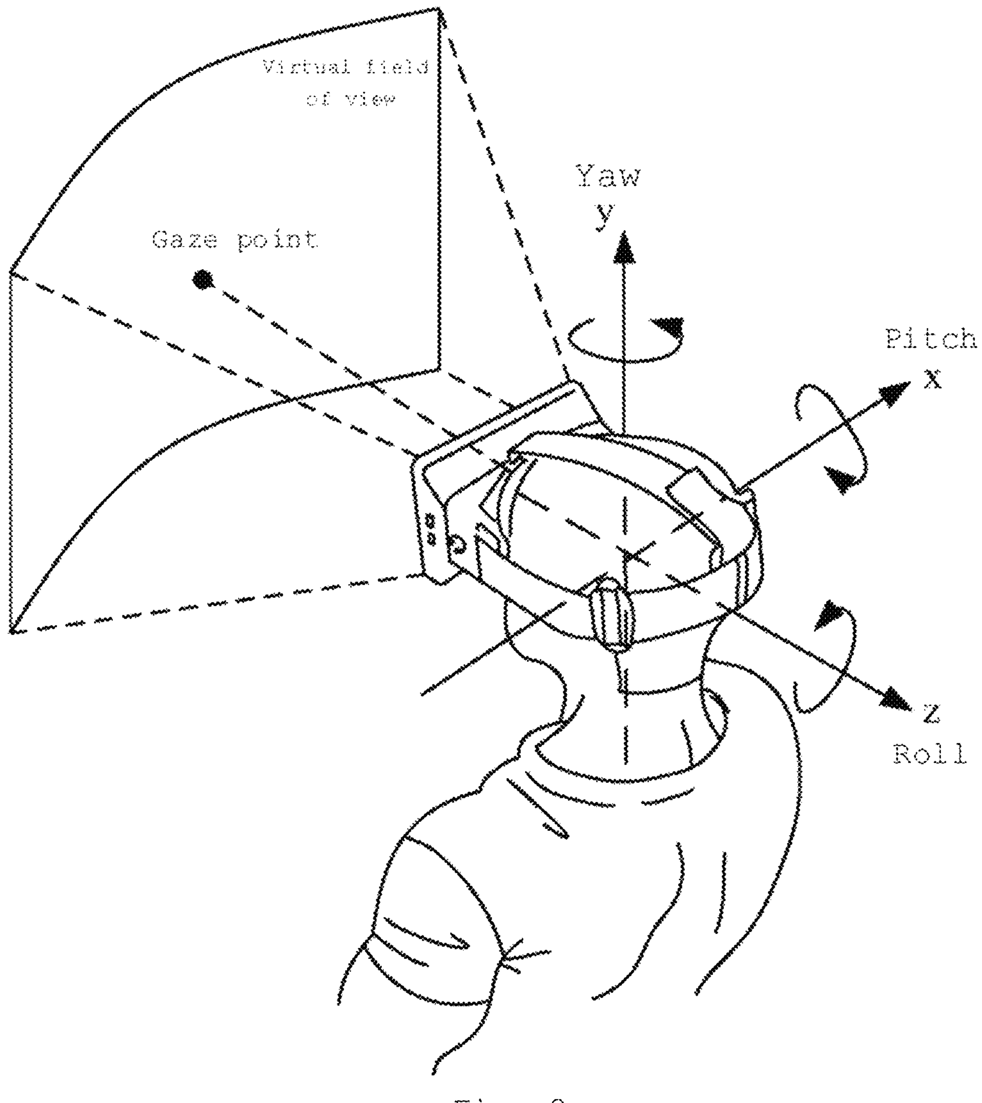
FIG. 2 is a schematic diagram of an application scenario of an extended reality device provided in an embodiment of the present disclosure.

FIG. 2 is a schematic diagram of an application scenario of an extended reality device provided in an embodiment of the present disclosure. In FIG. 2, the extended reality device is a head mounted display. Referring to FIG. 2, in the extended reality device, a sensor for posture detection (for example, a nine-axis sensor) is provided, for detecting a posture change of the extended reality device in real time; if a user wears the extended reality device, when a posture of the user head changes, the real-time posture of the head will be transmitted to a processor, to calculate a gaze point of a line of sight of the user in a virtual environment; and, according to the gaze point, an image within a user gaze range (i.e., a virtual field of view) in a three-dimensional model of the virtual environment is calculated, and the image is displayed on a display screen, thereby making the user have an immersion experience as if watching in a real environment.

Upon the use of the extended reality device, the user often needs to perform information input, for example, input English words, Chinese characters, numbers, punctuations, etc. into the extended reality device. The information input problem in an extended reality space is a key problem affecting ecological development. With the maturity of technologies, bare-handed (i.e., without use of an additional controller) operation of a virtual keyboard to complete information input can be achieved currently. However, in the existing bare-handed input solution, since the user needs to keep eyes on the virtual keyboard in real time to select and trigger a virtual key, touch typing cannot be made, which causes inefficiency of information input of the user.

Figure 3:
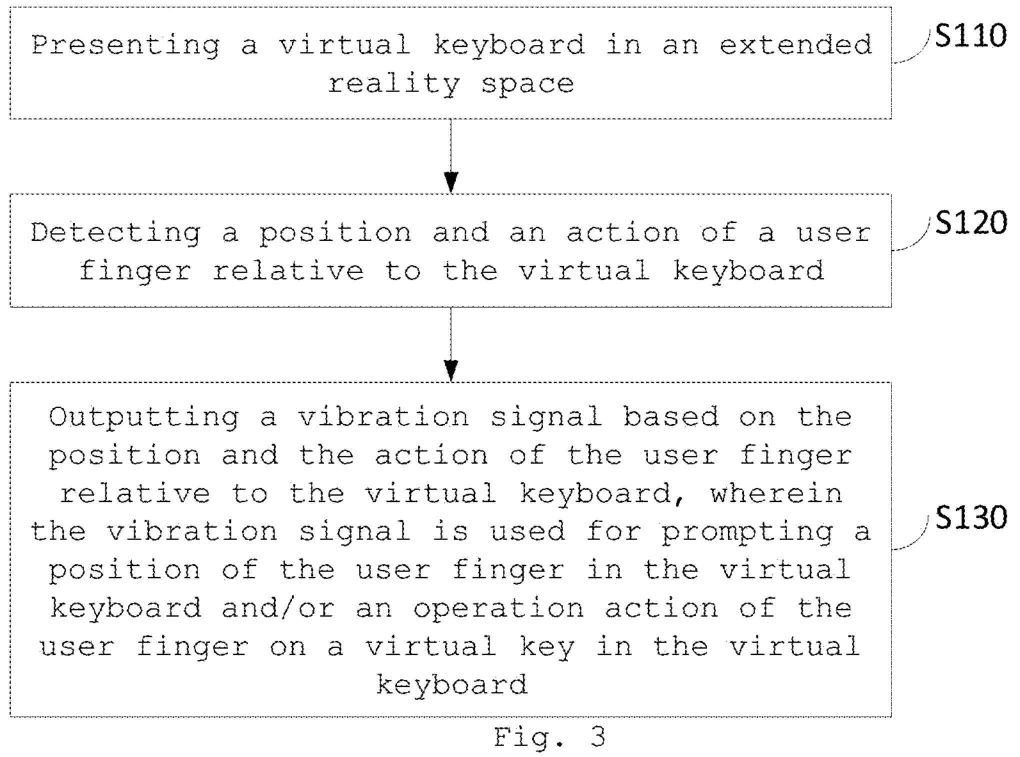
FIG. 3 is a flow diagram of an interaction method provided in an embodiment of the present disclosure.

In view of this, FIG. 3 is a flow diagram of an interaction method provided in an embodiment of the present disclosure; this embodiment is applicable to a case that a user wears an extended reality device and operates a virtual keyboard in an extended reality space bare-handedly for performing information input; and the method may be executed by an interaction apparatus that may be implemented in software and/or hardware and may be configured in the extended reality device, for example, a virtual reality device, an augmented reality device, an augmented virtual device, a mixed reality device, or the like.

As shown in FIG. 3, the method may specifically comprise:

S110, presenting a virtual keyboard in an extended reality space.

The virtual keyboard may be an abbreviated keyboard or a QWERTY keyboard. In the abbreviated keyboard, at least a part of an virtual key corresponds to N characters, where N is a positive integer greater than or equal to 2. Exemplarily, a virtual keyboard laid out according to a correspondence between keys and characters in a T9 keyboard is an abbreviated keyboard. In the QWERTY keyboard, one virtual key corresponds to one character.

The virtual keyboard comprises a plurality of virtual keys, and a non-key area surrounding the virtual key. An arrangement manner of the plurality of virtual keys in the keyboard is not limited in the present application.

S120, detecting a position and an action of a user finger relative to the virtual keyboard.

The position of the user finger relative to the virtual keyboard refers to a position where, when a fingertip of the finger is vertically projected on a plane where the virtual keyboard is located, a projection of the fingertip of the finger overlaps with the virtual keyboard.

It can be appreciated by those skilled in the art that, in the virtual keyboard, each virtual key corresponds to a triggerable range. The triggerable range may be defined by a boundary of a collider bound to each virtual key.

In practice, a size of the virtual key and a size of its corresponding triggerable range may be equal or unequal, which is not limited in the present application.

An area of overlap between the vertical projection of the fingertip of the finger on the plane where the virtual keyboard is located and a triggerable range of a certain virtual key in the virtual keyboard is greater than a set threshold, and the user keeps the position of the finger relative to the virtual keyboard unchanged, and completes a click action in a direction close to the plane where the virtual keyboard is located, which will trigger the virtual key, that is, input a character corresponding to the virtual key.

The position and the action of the user finger relative to the virtual keyboard comprises the user finger hovering over the virtual key and the user finger clicking the virtual key. The user finger hovering over the virtual key refers to the user finger making a hovering action, and the area of overlap between the vertical projection of the fingertip of the finger on the plane where the virtual keyboard is located and the triggerable range of one virtual key being greater than the set threshold. The user finger clicking the virtual key refers to, the area of overlap between the vertical projection of the fingertip of the user finger on the plane where the virtual keyboard is located and the triggerable range of one virtual key being greater than the set threshold, and the user finger making an action of clicking the virtual key. Apparently, "the user finger hovering over the virtual key" is a pre-action of "the user finger clicking the virtual key".

Further, the position and the action of the user finger relative to the virtual keyboard further comprises the user finger hovering over a non-key area. The user finger hovering over the non-key area refers to the user finger making a hovering action, and an area of overlap between a vertical projection of the fingertip of the user finger on the plane where the virtual keyboard is located and a triggerable range of any virtual key is less than or equal to the set threshold. It should be noted that, on the basis that the user finger hovers over the non-key area, the user keeps the position of the finger relative to the virtual keyboard unchanged, and completes a click action in a direction close to the plane where the virtual keyboard is located, which cannot trigger any virtual key.

In practice, the user may also need to input a plurality of characters in succession, and in this case, the user finger need to move in a certain direction parallel to the plane where the virtual keyboard is located so that the finger hovers over different virtual keys. Therefore, the action of the user finger relative to the virtual keyboard further comprises the user finger moving in a first direction, wherein the first direction is parallel to the plane where the virtual keyboard is located. A specific direction of the first direction is not limited in the present application, as long as it is parallel to the plane where the virtual keyboard is located.

There are various implementations of this step, which is not limited in the present application. Exemplarily, the implementation of this step comprises: periodically acquiring a user hand image by using an image sensor integrated in the extended reality device; and detecting the position and the action of the user finger relative to the virtual keyboard based on the user hand image. The "detecting the position and the action of the user finger relative to the virtual keyboard based on the user hand image" is a known technology, and is not repeated here.

Alternatively, the implementation of this step comprises: periodically acquiring a user hand image by using an image sensor integrated in the extended reality device; acquiring user hand action information by using a hand action acquisition device worn by a user hand; and detecting the position and the action of the user finger relative to the virtual keyboard based on the user hand image and the user hand action information. The hand action acquisition device may specifically comprise one or more of a myoelectricity sensor, a vibration sensor, a pulse sensor, and an inertia measurement unit. The "detecting the position and the action of the user finger relative to the virtual keyboard based on the user hand image and the user hand action information" is a known technology, and is not repeated here.

S130, outputting a vibration signal based on the position and the action of the user finger relative to the virtual keyboard, wherein the vibration signal is used for prompting a position of the user finger in the virtual keyboard and/or an operation action of the user finger on a virtual key in the virtual keyboard.

Optionally, the vibration signal is formed by a vibration motor, wherein the vibration motor is provided in an extended reality device, and/or the vibration motor is provided in a haptic feedback device in communication connection with the extended reality device.

The extended reality device is a head mounted extended reality device, and comprises an extended reality device body and a head band; and the extended reality device body refers to a body device implementing an extended reality effect. The head band refers to a component for fixing the extended reality device body to the user head in cooperation with the extended reality device body. In some embodiments, the head band may be provided in a form of legs of the glasses. If the vibration motor is provided in the extended reality device, the vibration motor is fixed in foam which is in contact with face of the extended reality device body, and/or, the vibration motor is fixed in the head band.

Further, the vibration motor is re-used as a focusing motor of a camera. Specifically, a camera is configured in the extended reality device, and the vibration motor is re-used as a focusing motor of the camera in the extended reality device. Alternatively, a camera is configured in the haptic feedback device, and the vibration motor is re-used as a focusing motor of the camera in the haptic feedback device.

If the vibration motor is provided in the haptic feedback device in communication connection with the extended reality device, the haptic feedback device may be provided in a form of a ring, a watch, a glove, or the like.

In the above technical method, by detecting the position and the action of the user finger relative to the virtual keyboard; and outputting the vibration signal based on the position and the action of the user finger relative to the virtual keyboard, the vibration signal being used for prompting the position of the user finger in the virtual keyboard and/or the operation action of the user finger on the virtual key in the virtual keyboard, upon bare-handed operation of the virtual keyboard, in the case of not watching the virtual keyboard with eyes, the user can, through the vibration signal, discriminate the position of the virtual key, and whether the virtual key is successfully triggered, which is beneficial to development of a touch typing habit, and improves the efficiency of information input of the user.

On the basis of the above technical solution, in one embodiment, optionally, the virtual keyboard comprises a plurality of virtual keys, wherein the virtual key corresponds to a first vibration signal and a second vibration signal; and the S130 comprises: outputting the first vibration signal if the user finger hovers over the virtual key; and/or outputting the second vibration signal if the user finger clicks the virtual key.

The first vibration signal and the second vibration signal may be the same vibration signal or different vibration signals. If the first vibration signal and the second vibration signal are different vibration signals, optionally, both differ in one or more of frequency, duration, and amplitude.

In another embodiment, the virtual keyboard comprises a plurality of virtual keys and a non-key area surrounding the virtual key, wherein the non-key area corresponds to a third vibration signal; and the S130 comprises: outputting the third vibration signal if the user finger hovers over the non-key area.

When the user finger hovers over the non-key area, it means that if the user keeps the position of the finger relative to the virtual keyboard unchanged and completes a click action in a direction close to the plane where the virtual keyboard is located, any virtual key cannot be triggered. That is, the position where the user finger is located is inappropriate at this time.

If the user finger hovers over the non-key area, when not watching the virtual keyboard, the user will not know that the position where the current user finger is located is inappropriate, and the third vibration signal can help the user to know the case of "the position where the current user finger is located is inappropriate".

Optionally, in order to enable the user to discriminate whether the position where the current user finger is located is appropriate, it is set that the third vibration signal is different from the first vibration signal, and the third vibration signal is different from the second vibration signal.

When a same finger of the user needs to successively click different virtual keys (such as a virtual key 1 and a virtual key 2), the user needs to first hover the finger at the virtual key 1, click the virtual key 1, move the finger from the virtual key 1 to the virtual key 2 so that the finger hovers over the virtual key 2, and click the virtual key 2. In the whole process, if the user does not watch the virtual keyboard, even if the user makes an action of moving the finger, the user does not know whether the finger has moved to the virtual key 2 because of inaccurate estimation of a moving distance of the finger. Based on this, optionally, the non-key area also corresponds to a fourth vibration signal; and the S130 comprises: outputting the fourth vibration signal if the user finger moves in the first direction and passes the non-key area in the process of the moving, wherein the first direction is parallel to the plane where the virtual keyboard is located. The purpose of this setting is to assist the user in estimating the finger moving distance through the fourth vibration signal, and further judging which virtual key the current finger has moved to.

Further, it may be set that the number of times the fourth vibration signal is output is consistent with the number of times the non-key area is passed in the process of the moving of the user finger. The purpose of this setting is to assist the user in judging which virtual key the current finger has moved to through the number of times the fourth vibration signal is output, so that accuracy of the judgment result of the user can be improved.

Figure 4:
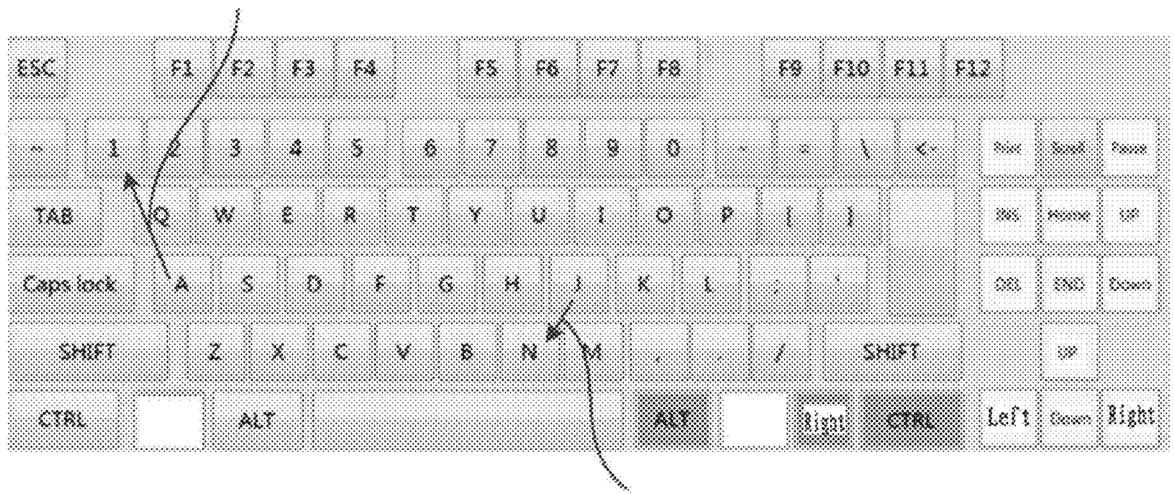
FIG. 4 is a schematic diagram of a virtual keyboard provided in an embodiment of the present disclosure.

FIG. 4 is a schematic diagram of a virtual keyboard provided in an embodiment of the present disclosure. Referring to FIG. 4, the virtual keyboard is the QWERT keyboard, which comprises a plurality of virtual keys; and in FIG. 4, if at a certain moment, fingers of both hands of the user are at reference key positions, that is, a little finger of a left hand of the user hovers over a virtual key "A", a ring finger hovers over a virtual key "S", a middle finger hovers over a virtual key "D", an index finger hovers over a virtual key "F", and a thumb hovers over a virtual key spacebar; a little finger of a right hand of the user hovers over a virtual key ";", a ring finger hovers over a virtual key "L", a middle finger hovers over a virtual key "K", an index finger hovers over a virtual key "J", and a thumb hovers over the virtual key spacebar, the first vibration signal is output to prompt that the fingers of the both hands of the user are currently at the reference key positions.

Assuming that when the user needs to input "N1", the user moves the index finger of his right hand from the virtual key "J" to a virtual key "N" in a first direction 1 in FIG. 4, and in the process of the moving, the non-key area is passed once, and the fourth vibration signal is output once. Through the reminder of the fourth vibration signal, the user may estimate a position where the virtual key "N" is located and hover the index finger of the right hand over the virtual key "N". After the index finger of the right hand of the user clicks the virtual key "N", the second vibration signal is output to prompt that the clicking of the virtual key "N" is triggered successfully. After that, the user moves the little finger of his left hand from the virtual key "A" to a virtual key "1" in a first direction 2 in FIG. 4, and in the process of the moving, the non-key area is passed twice and the fourth vibration signal is output twice. Through the reminder of the fourth vibration signal, the user can estimate a position where the virtual key "1" is located and hover the little finger of the left hand at the virtual key "1". After the little finger of the left hand of the user clicks the virtual key "1", the second vibration signal is output to prompt that the clicking of the virtual key "1" is triggered successfully.

On the basis of the above technical solution, optionally, the method further comprises: outputting visual prompt information based on the position and the action of the user finger relative to the virtual keyboard, wherein the visual prompt information is used for prompting the position of the user finger in the virtual keyboard and/or the operation action of the user finger on the virtual key in the virtual keyboard. The visual prompt information helps to intuitively convey the position of the current user finger in the virtual keyboard and/or the operation action of the current user finger on the virtual key in the virtual keyboard to the user, in a visually perceptible manner in the case that the user observes the virtual keyboard.

During an initial period of developing a touch typing habit, the visual prompt information can assist the user in quickly becoming familiar with the positions of the virtual keys to establish muscle memory of moving from a certain specific virtual key to another specific virtual key, hovering over a certain specific virtual key, and clicking a certain specific virtual key.

There are various specific implementations of "outputting visual prompt information based on the position and the action of the user finger relative to the virtual keyboard", which are not limited in the present application. Exemplarily, the outputting visual prompt information based on the position and the action of the user finger relative to the virtual keyboard comprises at least one of: if the user finger hovers over the virtual key, setting a presentation state of the virtual key hovered as a first highlight state; if the user finger clicks the virtual key, setting a presentation state of the virtual key clicked as a second highlight state; or, if the user finger moves in a first direction, setting a presentation state of the virtual key passed in the process of the moving of the user finger as a third highlight state.

Setting a presentation state of the virtual key as the first highlight state refers to adjusting the presentation state of the virtual key so that it is different from a presentation state in an initial state. Exemplarily, a background color of the virtual key in the first highlight state is different from that of the virtual key in the initial state, and/or an outline color of the virtual key in the first highlight state is different from that of the virtual key in the initial state. The initial state refers to that the finger neither hovers over the virtual keyboard nor triggers any virtual key in the virtual keyboard.

Setting a presentation state of the virtual key as the second highlight state and setting a presentation state of the virtual key as the third highlight state, are similar to the setting a presentation state of the virtual key as the first highlight state, which is not repeated here.

In the present application, any two of the first highlight state, the second highlight state, and the third highlight state may have the same or different display effects, which is not limited in the present application.

In one embodiment, the first highlight state has the same display effect as the third highlight state, and the first highlight state has a different display effect from the second highlight state. Exemplarily, in the initial state, background colors of the virtual keys in the virtual keyboard are all milky white, and if the user finger hovers over the virtual key "A", a background color of the virtual key "A" is adjusted to green (i.e., the first highlight state). If the user finger clicks the virtual key "A", the background color of the virtual key "A" is adjusted to red (i.e., the second highlight state). If the user finger moves in the first direction, from the virtual key "A" to the virtual key "1", and in the process of the moving of the user finger, when a virtual key "Q" is passed, a background color of the virtual key "Q" is adjusted to green, and the background color of the virtual key "A" is adjusted to milky white; when the virtual key "1" is reached, a background color of the virtual key "1" is adjusted to green, and the background color of the virtual key "Q" is adjusted to milky white.

It should be noted that for the foregoing method embodiments, for the purpose of simple description, they are expressed as a series of action combinations, but those skilled in the art should appreciate that the present application is not limited by the described action order, as certain steps may be performed in another order or concurrently according to the present application. Further, those skilled in the art should also appreciate that the embodiments described in this description are all particular embodiments and that the involved actions or modules are not necessarily required by the present application.

Figure 5:
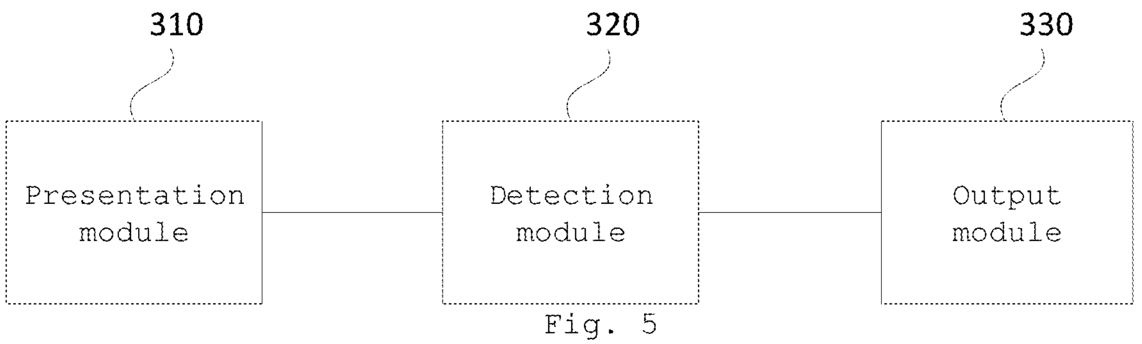
FIG. 5 is a schematic structural diagram of an interaction apparatus in an embodiment of the present disclosure.

FIG. 5 is a schematic structural diagram of an interaction apparatus in an embodiment of the present disclosure. The interaction apparatus provided in the embodiment of the present disclosure may be configured in an extended reality device. Referring to FIG. 5, the interaction apparatus specifically comprises:

a presentation module 310 configured to present a virtual keyboard in an extended reality space;

a detection module 320 configured to detect a position and an action of a user finger relative to the virtual keyboard; and an output module 330 configured to output a vibration signal based on the position and the action of the user finger relative to the virtual keyboard, wherein the vibration signal is used for prompting a position of the user finger in the virtual keyboard and/or an operation action of the user finger on a virtual key in the virtual keyboard.

Further, the virtual keyboard comprises a plurality of virtual keys, wherein the virtual key corresponds to a first vibration signal and a second vibration signal; and the output module 330 is configured to:

output the first vibration signal if the user finger hovers over the virtual key; and/or output the second vibration signal if the user finger clicks the virtual key.

Further, the virtual keyboard comprises a plurality of virtual keys and a non-key area surrounding the virtual key, wherein the non-key area corresponds to a third vibration signal; and the output module 330 is configured to: output the third vibration signal if the user finger hovers over the non-key area.

Furthermore, the non-key area further corresponds to a fourth vibration signal; and the output module 330 is configured to:

output the fourth vibration signal if the user finger moves in a first direction and passes the non-key area in the process of the moving, wherein the first direction is parallel to a plane where the virtual keyboard is located.

Further, the number of times the fourth vibration signal is output is consistent with the number of times the non-key area is passed in the process of the moving of the user finger.

Further, the vibration signal is formed by a vibration motor, wherein the vibration motor is provided in an extended reality device, and/or the vibration motor is provided in a haptic feedback device in communication connection with the extended reality device.

Further, the extended reality device is a head mounted extended reality device, and the extended reality device comprises an extended reality device body and a head band; and if the vibration motor is provided in the extended reality device, the vibration motor is fixed in foam which is in contact with face of the extended reality device body, and/or, the vibration motor is fixed in the head band.

Further, the vibration motor is re-used as a focusing motor of a camera.

Further, the output module 330 is further configured to output visual prompt information based on the position and the action of the user finger relative to the virtual keyboard, wherein the visual prompt information is used for prompting the position of the user finger in the virtual keyboard and/or the operation action of the user finger on the virtual key in the virtual keyboard.

Further, the output module 330 is configured to perform at least one of:

if the user finger hovers over the virtual key, setting a presentation state of the virtual key hovered as a first highlight state;

if the user finger clicks the virtual key, setting a presentation state of the virtual key clicked as a second highlight state; or if the user finger moves in a first direction, setting a presentation state of the virtual key passed in the process of the moving of the user finger as a third highlight state.

The interaction apparatus provided in the embodiment of the present disclosure may perform the steps performed by the extended reality device in the interaction method provided in the method embodiment of the present disclosure, and has beneficial effects of performing the steps, which are not repeated here.

Figure 6:
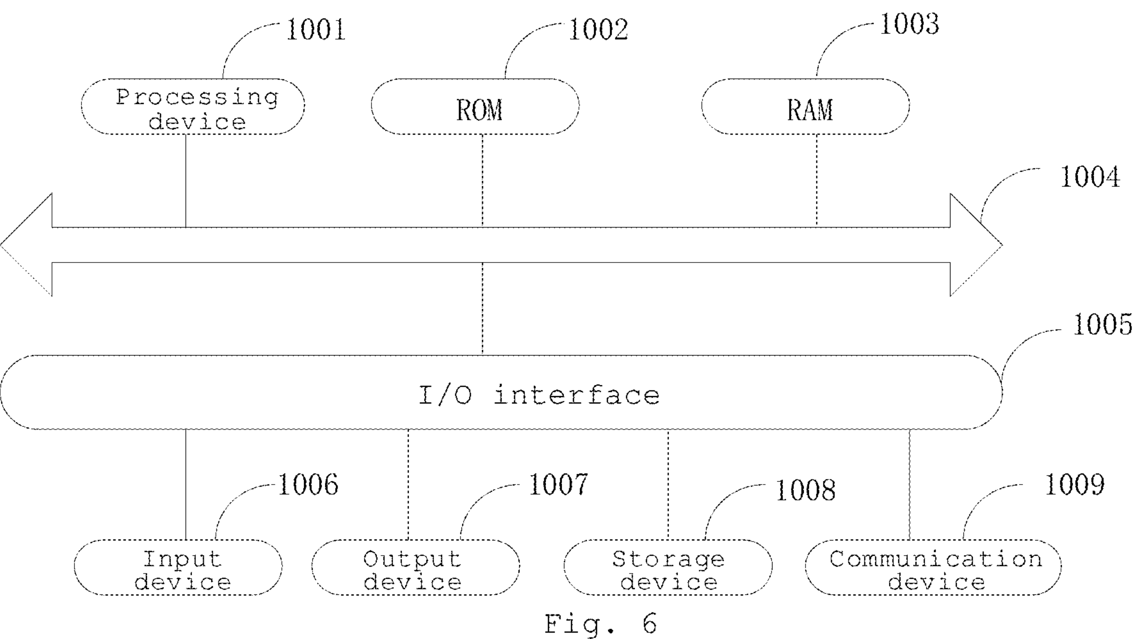
FIG. 6 is a schematic structural diagram of an electronic device in an embodiment of the present disclosure.

FIG. 6 is a schematic structural diagram of an electronic device in an embodiment of the present disclosure. Reference is specifically made below to FIG. 6, which illustrates a schematic structural diagram of an electronic device 1000 suitable for use in implementing an embodiment of the present disclosure. The electronic device 1000 in the embodiment of the present disclosure may include, but is not limited to, a mobile terminal such as a mobile phone, notebook computer, digital broadcast receiver, PDA (Personal Digital Assistant), PAD (tablet computer), PMP (Portable Multimedia Player), vehicle-mounted terminal (e.g., vehicle-mounted navigation terminal), and wearable electronic device, and a fixed terminal such as a digital TV, desktop computer, and smart home device. The electronic device shown in FIG. 6 is only an example, and should not bring any limitation to the functions and the scope of use of the embodiment of the present disclosure.

As shown in FIG. 6, the electronic device 1000 may comprise a processing device (e.g., a central processing unit, a graphics processing unit, etc.) 1001 which may perform various appropriate actions and processes according to a program stored in a read-only memory (ROM) 1002 or a program loaded from a storage device 1008 into a random access memory (RAM) 1003 to implement the interaction method of the embodiment according to the present disclosure. In the RAM 1003, various programs and information necessary for the operation of the electronic device 1000 are also stored. The processing device 1001, ROM 1002, and RAM 1003 are connected to each other by a bus 1004. An input/output (I/O) interface 1005 is also connected to the bus 1004.

Generally, the following device may be connected to the I/O interface 1005: an input device 1006 including, for example, a touch screen, touch pad, keyboard, mouse, camera, microphone, accelerometer, gyroscope, etc.; an output device 1007 including, for example, a liquid crystal display (LCD), speaker, vibrator, etc.; the storage device 1008 including, for example, a magnetic tape, hard disk, etc.; and a communication device 1009. The communication device 1009 may allow the electronic device 1000 to communicate wirelessly or by wire with other devices to exchange information. While FIG. 6 illustrates the electronic device 1000 having various device, it should be understood that not all illustrated device are required to be implemented or provided. More or fewer device may be alternatively implemented or provided.

In particular, according to the embodiment of the present disclosure, the processes described above with reference to the flow diagrams may be implemented as a computer software program. For example, the embodiment of the present disclosure comprises a computer program product that comprises a computer program carried on a non-transitory computer-readable medium, the computer program containing program code for performing the method illustrated by the flow diagrams so as to achieve the above-mentioned interaction method. In such an embodiment, the computer program may be downloaded from a network via the communication device 1009 and installed, or installed from the storage device 1008, or installed from the ROM 1002. The computer program, when executed by the processing device 1001, performs the above functions defined in the method of the embodiment of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may comprise an information signal propagated in baseband or as part of a carrier wave, in which computer-readable program code is carried. Such a propagated information signal may take a variety of forms, including, but not limited to, an electromagnetic signal, optical signal, or any suitable combination of the forgoing. The computer-readable signal medium may be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some embodiments, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may be exist separately without being assembled into the electronic device.

The above computer-readable medium has one or more programs carried thereon, which, when executed by the electronic device, cause the electronic device to:

present a virtual keyboard in an extended reality space;

detect a position and an action of a user finger relative to the virtual keyboard; and output a vibration signal based on the position and the action of the user finger relative to the virtual keyboard, wherein the vibration signal is used for prompting a position of the user finger in the virtual keyboard and/or an operation action of the user finger on a virtual key in the virtual keyboard.

Optionally, when the above one or more programs are executed by the electronic device, the electronic device may also perform the other steps described in the above embodiments.

The computer program code for performing the operation of the present disclosure may be written in one or more programming languages or a combination thereof, wherein the above programming language include but is not limited to an object-oriented programming language such as Java, Smalltalk, C++, and also include a conventional procedural programming language, such as the "C" programming language or a similar programming language. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which comprises one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved unit described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), or the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided an electronic device, comprising:

one or more processors; and a memory configured to store one or more programs, wherein the one or more programs, when executed by the one or more processors, cause the one or more processors to implement any of the interaction methods according to the present disclosure.

According to one or more embodiments of the present disclosure, there is provided a non-transitory computer-readable storage medium having a computer program stored thereon, which, when executed by a processor, implements any of the interaction methods according to the present disclosure.

The embodiments of the present disclosure further provide a computer program product, comprising a computer program or instructions which, when executed by a processor, implements the interaction method as described above.

It should be noted that, relational terms such as "first" and "second", herein, are only used for distinguishing one entity or operation from another entity or operation without necessarily requiring or implying any such actual relation or order between these entities or operations. Moreover, the term "include", "including", or any other variation thereof, is intended to encompass a non-exclusive inclusion, such that a process, method, article, or device including a list of elements includes not only those elements but also other elements not expressly listed, or elements inherent to such a process, method, article, or device. Without more limitations, an element defined by a statement "including one . . . " does not exclude the presence of another identical element in the process, method, article, or device that includes the element.

The above contents are only specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments described herein, but afford the widest scope consistent with the principles and novel characteristics disclosed herein.

What is claimed is:

1. An interaction method, the method comprising:

presenting a virtual keyboard in an extended reality space;

detecting a position and an action of a user finger relative to the virtual keyboard; and outputting a vibration signal based on the position and the action of the user finger relative to the virtual keyboard, wherein the vibration signal is used for prompting the position of the user finger in the virtual keyboard and an operation action of the user finger on a virtual key in the virtual keyboard, wherein the virtual keyboard comprises a plurality of virtual keys and a non-key area surrounding the virtual keys and located between adjacent virtual keys, the outputting the vibration signal based on the position and the action of the user finger relative to the virtual keyboard comprises at least one of:

outputting a first vibration signal in response to the user finger hovering over the virtual key; or outputting a second vibration signal in response to the user finger clicking the virtual key, and the outputting the vibration signal based on the position and the action of the user finger relative to the virtual keyboard further comprises: outputting a third vibration signal in response to the user finger hovering over the non-key area, and wherein the third vibration signal output in response to the user finger hovering over the non-key area is different from the first vibration signal output in response to the user finger hovering over the virtual key or the second vibration signal output in response to the user finger clicking the virtual key, so as to enable a user to discriminate whether a position where the user finger is currently located is appropriate.

2. The method according to claim 1, wherein the outputting the vibration signal based on the position and the action of the user finger relative to the virtual keyboard further comprises:

outputting a fourth vibration signal in response to the user finger moving in a first direction and passing the non-key area in a process of the moving, wherein the first direction is parallel to a plane where the virtual keyboard is located, and wherein a number of times the fourth vibration signal is output is consistent with a number of times the non-key area is passed in the process of the moving of the user finger, so as to assist the user in estimating a finger moving distance and further judging which virtual key the user finger has currently moved to.

3. The method according to claim 1, wherein the vibration signal is formed by a vibration motor; and wherein the vibration motor is provided in at least one of an extended reality device or a haptic feedback device in communication connection with an extended reality device.

4. The method according to claim 3, wherein the extended reality device is a head mounted extended reality device, and the extended reality device comprises an extended reality device body and a head band; and in response to the vibration motor being provided in the extended reality device, the vibration motor is fixed in at least one of foam which is in contact with face of the extended reality device body or the head band.

5. The method according to claim 3, wherein the vibration motor is re-used as a focusing motor of a camera.

6. The method according to claim 1, further comprising:

outputting visual prompt information based on the position and the action of the user finger relative to the virtual keyboard, wherein the visual prompt information is used for prompting the position of the user finger in the virtual keyboard and the operation action of the user finger on the virtual key in the virtual keyboard.

7. The method according to claim 6, wherein the outputting the visual prompt information based on the position and the action of the user finger relative to the virtual keyboard comprises at least one of:

in response to the user finger hovering over the virtual key, setting a presentation state of the virtual key hovered as a first highlight state;

in response to the user finger clicking the virtual key, setting a presentation state of the virtual key clicked as a second highlight state; or in response to the user finger moving in a first direction, setting a presentation state of the virtual key currently passed in a process of the moving of the user finger as a third highlight state, wherein the first highlight state has the same display effect as the third highlight state, and the first highlight state has a different display effect from the second highlight state.

8. The method according to claim 1, wherein the user finger hovering over the non-key area refers to the user finger making the hovering action, and an area of overlap between a vertical projection of a fingertip of the user finger on a plane where the virtual keyboard is located and a triggerable range of any virtual key being less than or equal to a set threshold.

9. An electronic device, the electronic device comprising:

one or more processors; and a storage device configured to store one or more programs, wherein the one or more programs, when executed by the one or more processors, causes the one or more processors to perform the following operations:

presenting a virtual keyboard in an extended reality space;

detecting a position and an action of a user finger relative to the virtual keyboard; and outputting a vibration signal based on the position and the action of the user finger relative to the virtual keyboard, wherein the vibration signal is used for prompting the position of the user finger in the virtual keyboard and an operation action of the user finger on a virtual key in the virtual keyboard, wherein the virtual keyboard comprises a plurality of virtual keys and a non-key area surrounding the virtual keys and located between adjacent virtual keys;

the outputting the vibration signal based on the position and the action of the user finger relative to the virtual keyboard comprises at least one of:

outputting a first vibration signal in response to the user finger hovering over the virtual key; or outputting a second vibration signal in response to the user finger clicking the virtual key, and the outputting the vibration signal based on the position and the action of the user finger relative to the virtual keyboard further comprises: outputting a third vibration signal in response to the user finger hovering over the non-key area, and wherein the third vibration signal output in response to the user finger hovering over the non-key area is different from the first vibration signal output in response to the user finger hovering over the virtual key or the second vibration signal output in response to the user finger clicking the virtual key, so as to enable a user to discriminate whether a position where the user finger is currently located is appropriate.

10. The electronic device according to claim 9, wherein the outputting the vibration signal based on the position and the action of the user finger relative to the virtual keyboard further comprises:

outputting a fourth vibration signal in response to the user finger moving in a first direction and passing the non-key area in a process of the moving, wherein the first direction is parallel to a plane where the virtual keyboard is located, and wherein a number of times the fourth vibration signal is output is consistent with a number of times the non-key area is passed in the process of the moving of the user finger, so as to assist the user in estimating a finger moving distance and further judging which virtual key the user finger has currently moved to.

11. The electronic device according to claim 9, wherein the user finger hovering over the non-key area refers to the user finger making the hovering action, and an area of overlap between a vertical projection of a fingertip of the user finger on a plane where the virtual keyboard is located and a triggerable range of any virtual key being less than or equal to a set threshold.

12. A non-transitory computer-readable storage medium having a computer program stored thereon, wherein the computer program, when executed by a processor, causes the processor to perform the following operations:

presenting a virtual keyboard in an extended reality space;

detecting a position and an action of a user finger relative to the virtual keyboard; and outputting a vibration signal based on the position and the action of the user finger relative to the virtual keyboard, wherein the vibration signal is used for prompting the position of the user finger in the virtual keyboard and an operation action of the user finger on a virtual key in the virtual keyboard, wherein the virtual keyboard comprises a plurality of virtual keys and a non-key area surrounding the virtual keys and located between adjacent virtual keys, the outputting the vibration signal based on the position and the action of the user finger relative to the virtual keyboard comprises at least one of:

outputting a first vibration signal in response to the user finger hovering over the virtual key; or outputting a second vibration signal in response to the user finger clicking the virtual key, and the outputting the vibration signal based on the position and the action of the user finger relative to the virtual keyboard further comprises: outputting a third vibration signal in response to the user finger hovering over the non-key area, and wherein the third vibration signal output in response to the user finger hovering over the non-key area is different from the first vibration signal output in response to the user finger hovering over the virtual key or the second vibration signal output in response to the user finger clicking the virtual key, so as to enable a user to discriminate whether a position where the user finger is currently located is appropriate.

13. The computer-readable storage medium according to claim 12, wherein the outputting the vibration signal based on the position and the action of the user finger relative to the virtual keyboard further comprises:

outputting a fourth vibration signal in response to the user finger moving in a first direction and passing the non-key area in a process of the moving, wherein the first direction is parallel to a plane where the virtual keyboard is located, and wherein a number of times the fourth vibration signal is output is consistent with a number of times the non-key area is passed in the process of the moving of the user finger, so as to assist the user in estimating a finger moving distance and further judging which virtual key the user finger has currently moved to.

14. The computer-readable storage medium according to claim 12, wherein the user finger hovering over the non-key area refers to the user finger making the hovering action, and an area of overlap between a vertical projection of a fingertip of the user finger on a plane where the virtual keyboard is located and a triggerable range of any virtual key being less than or equal to a set threshold.

* * * * *